(12) United States Patent  (10) Patent No.: US 8,897,913 B2
Luo  (45) Date of Patent: Nov. 25, 2014

(54) AUTOMATIC STACKED STORAGE SYSTEM FOR PARKING OR STORAGE

(71) Applicant: Chunsong Luo, Cranston, RI (US)

(72) Inventor: Chunsong Luo, Cranston, RI (US)

( * ) Notice: Subject to any disclaimer, the term of this patent is extended or adjusted under 35 U.S.C. 154(b) by 0 days.

(21) Appl. No.: 13/966,380

(22) Filed: Aug. 14, 2013

(65) Prior Publication Data

US 2014/0114466 A1  Apr. 24, 2014

Related U.S. Application Data

(60) Provisional application No. 61/795,545, filed on Oct. 19, 2012.

(51) Int. Cl.
 *G06F 7/00* (2006.01)
 *B65G 1/04* (2006.01)
 *E04H 6/22* (2006.01)
(52) U.S. Cl.
 CPC ............... *B65G 1/0478* (2013.01); *E04H 6/22* (2013.01)
 USPC ............ 700/224; 700/213; 700/217; 700/218
(58) Field of Classification Search
 None
 See application file for complete search history.

(56) References Cited

U.S. PATENT DOCUMENTS

| 3,618,793 | A | * | 11/1971 | Coursey ............... 414/233 |
| 6,212,832 | B1 | | 4/2001 | Gao |
| 6,842,665 | B2 | | 1/2005 | Karlen |
| 7,123,988 | B2 | | 10/2006 | Russell et al. |
| 7,941,243 | B2 | | 5/2011 | Borgwarth et al. |
| 2005/0207876 | A1 | | 9/2005 | Springwater |

\* cited by examiner

*Primary Examiner* — Yolanda Cumbess
(74) *Attorney, Agent, or Firm* — CUSPA Technology Law Associates; Yi Li

(57) ABSTRACT

An automatic stacked parking or storage system includes a plurality of stationary docking cells, a plurality of carriages, and a central management system communicating with and controlling operations of the docking cells. Each docking cell has a ground driving device affixed on the bottom of the docking cell to drive a carriage horizontally in different directions of the docking cell, a docking cell control and interface unit (CIU), and one or more carriage position and ID sensor. A loaded carriage is moved horizontally by the ground driving devices of corresponding docking cells from a starting to a destination docking cell according to a route selected by a route optimization module. The location of the loaded carriage in the selected route is dynamically updated according to real time reports from each CIU of the corresponding docking cells. The system transports multiple loaded carriages at the same time for parking/storage and retrieval.

20 Claims, 10 Drawing Sheets

AUTOMATIC STACKED STORAGE SYSTEM FOR PARKING OR STORAGE

CROSS REFERENCE TO RELATED APPLICATION

This application claims the benefit under 35 USC 119 (e) of the provisional patent application Ser. No. 61/795,545, filed Oct. 19, 2012, which is hereby incorporated by reference in its entirety.

FIELD OF THE INVENTION

The present invention relates to an automatic stacked storage system for car parking or storage. The system is also useful in library, luggage transportation, assembling line, package transportation or sorting, and other industrial applications.

BACKGROUND OF THE INVENTION

Space and land in urban are such a treasure, saving in space and construction cost is invaluable. In parking garages, recently most solutions are directed to providing stackable parking system in multi-level garages with elevators to replace conventional garages that have ramps and require larger and complex building structure.

Some stacked parking systems use horizontally moving-on-track lifts, or circular parking silo having a rotating vertical lift to transport cars into stacked bays. These systems have a high demand of lift usage, which relies on a lifting device for each parking and retrieval of a car. In these systems, at any time if the lifting device is out of service because of malfunction or maintenance, no parking or retrieving service can be provided by the system. Moreover, these existing systems have limited bays-per-lift and have space constrains to meet demands of a heavy traffic facility. Furthermore, these systems require fixed blueprints for the facility and have a low adaptability to available existing buildings or storage facilities.

Another type of system uses robotic or non-robotic shuttles to move cars to designated locations. This type of approach can provide dense parking. However, such a system is limited by the number of shuttles that can be used at the same time in order to prevent collision. It also has less systematic controlled movement, and less reliable battery powers in the shuttles. Therefore, shuttle operated systems have limited utility for high traffic capacity facilities.

Other known storage systems move carriers horizontally to designated locations within a facility configured as a matrix. One type system uses carriers having onboard side driving mechanism to drive one carrier against the next carrier to enable the movement. This type of system requires almost all storage spaces being occupied by carriers in order to support the carrier movement, due to the reliance on mutual engagement of neighboring units. Although such a system can support high density storage, such as for storage of payload, it is not suitable for heavy traffic facilities, because the extent of shuffling of the carriers is extensive in a process of moving one carrier from one location to another. Moreover, battery operated onboard driving mechanism requires frequent maintenance. Another type system uses combined upper and lower driving devices to move a carrier engaged between two sets of driving devices. Such system involves complex driving mechanisms and it relies on the driver of the overall system.

Therefore, there is a need for an improved stacked storage system that overcomes the above mentioned deficiencies. It is desirable for a system that is more versatile in its structure blueprint, and has improved operation efficiency and flexibility, and high tolerance to operating conditions of structural components of the system. It is desirable to have a parking system that can handle multiple parking and retrievals at the same time, which are particularly needed for high capacity and heavy traffic facilities.

SUMMARY OF THE INVENTION

In one aspect, the present invention is directed to an automatic stacked storage system for car parking or package storage. In one embodiment, An automatic stacked storage system for parking or storage, the system comprising a plurality of stationary docking cells positioned one next to another continuously in a lateral direction and a direction orthogonal thereto on a floor of a building or framed structure; each docking cell having a cell ID representing an address thereof in the building or framed structure; each docking cell comprising at least one ground driving device affixed on a bottom of the docking cell for driving horizontally a carriage engaged thereon in different directions of the docking cell; a docking cell control and interface unit (CIU) comprising at least one microprocessor and one or more operating program for controlling operation of the ground driving device; and one or more carriage position and ID sensors in communication with the CIU; a plurality of the carriage to be moved across the plurality of docking cells, driven by the ground driving devices affixed in the docking cells; each carriage comprising a planar platform comprising, on a bottom side thereof, an engagement structure in mating relationship with the ground driving device of each docking cell; each carriage having thereon a carriage identification and at least one position tag detectable by the one or more carriage position and ID sensors in the docking cells; and a central management system communicating with and controlling operation of the CIU of each docking cell.

The central management system comprises an ID association module, a parking optimization module, and a route optimization module. The ID association module comprises one or more software programs for grouping identifications of an object and the carriage on which the object is situated as a pair, and associating the pair with the docking cell in which the pair is situated to generate an association relation code; and an ID association database for storing the association relation code associated with each corresponding docking cell. The ID association database is updated dynamically according to real time report from the CIU of each corresponding docking cell in the system.

The system can move multiple loaded carriages concurrently from their starting docking cells to their destination docking cells according to corresponding transport route selected for each of the loaded carriages.

The parking optimization module comprises one or more software program to assign a priority score to each docking cell for selection of a destination docking cell for storing an object, according to facility layout, time, distance or cost involved in moving a loaded carriage presumably to each docking cell as the destination docking cell. The route optimization module comprises a route optimization algorithm for selecting a transport route to move a loaded carriage from a starting docking cell to a destination docking cell.

In a further aspect, the present invention is directed to a process for storing an object in an automatic stacked storage system. registering an object to be stored into the automatic stacked storage system described above; loading the object on one carriage in a starting docking cell; selecting a destination docking cell by the central management system; determining a transport route from a starting docking cell to the destination docking cell by a route optimization module of the central management system; and activating automatically each the ground drive device by the CIU in corresponding docking cells in the transport route, as commanded by the central management system, and driving the carriage with the object loaded thereon horizontally from the starting docking cell through the corresponding docking cells in the transport route to the destination docking cell.

The advantages of the present invention will become apparent from the following description taken in conjunction with the accompanying drawings showing exemplary embodiments of the invention.

BRIEF DESCRIPTION OF THE DRAWINGS

It is noted that in the drawings like numerals refer to like components.

DETAILED DESCRIPTION OF THE INVENTION

In one embodiment, the present invention is directed to an automatic stacked storage system for car parking or storage. The system can alternatively be used for library, luggage transportation, assembling line, package transportation or sorting, and other industrial applications.

Figure 1:
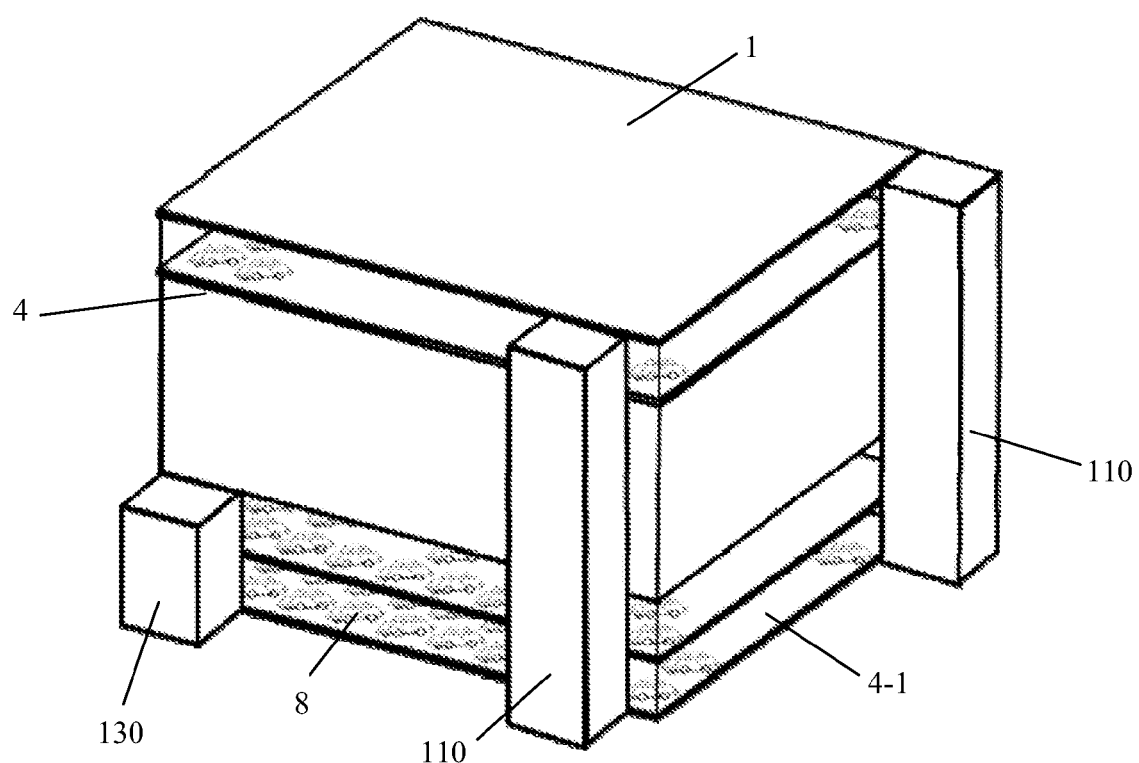
FIG. 1 is a schematic perspective view of a parking facility according to the present invention.
Figure 2:
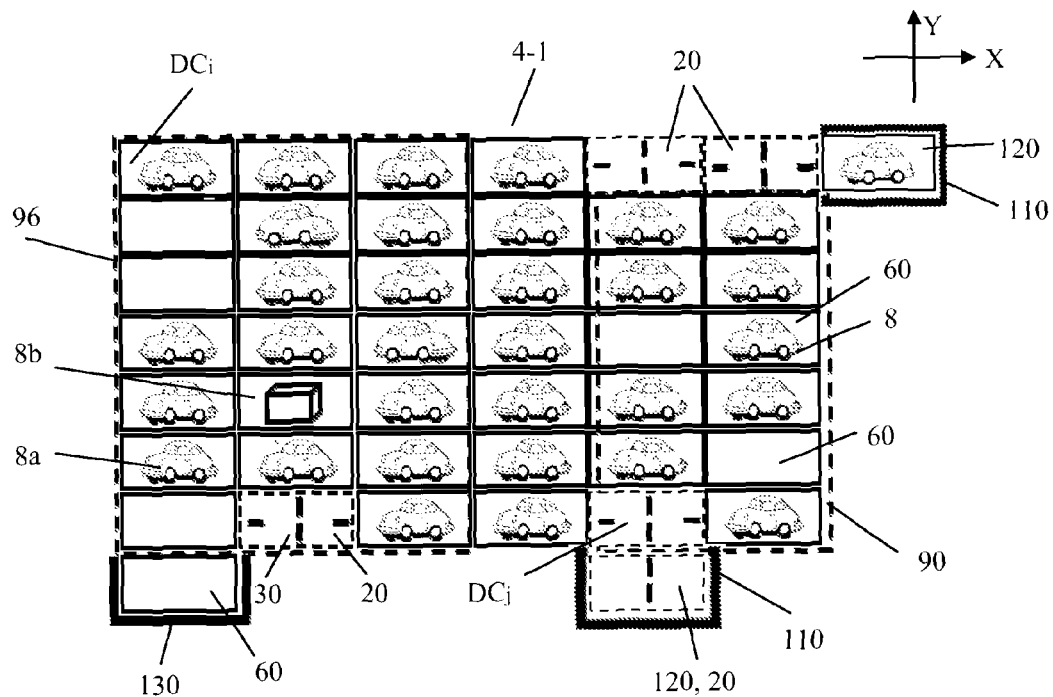
FIG. 2 is a schematic plan view of the ground floor of the parking facility of FIG. 1.

In one embodiment, the present invention provides an automatic stacked storage system as a multi-level parking facility as schematically illustrated in FIG. 1. As shown in FIGS. 1 and 2, the automatic stacked storage system 10 comprises a plurality of stationary docking cells 20 on a floor 4 of a building or framed structure 1, a plurality of carriages 60, and a central management system (MGS) 140 (FIG. 12) communicating with and managing operations of the docking cells. Herein, the term "object" includes, but not limited to, car, motorcycle, package, container, or any other storage items.

Optionally, the automatic stacked storage system 10 further includes one or more elevator shafts 110 and elevator cars 120 for transporting an object among different levels of a building. Optionally, the automatic stacked storage system 10 may further include one or more carriage holding bay 130 for storage of unused carriages.

FIG. 2 shows an illustrative plan view of the ground floor 4-1 of building 1 of the parking facility. As shown, the ground floor is divided into a plurality of docking cells 20. Each docking cell 20 includes a three dimensional space. In the exemplary embodiment shown, docking cell 20 has a rectangular cross section. As illustrated in FIG. 2, at a given non-transitional moment some docking cells 20 are occupied with a carriage 60 without an object, and some carriages 60 have thereon an object 8, such as a car 8a or a container 8b. The docking cells 20 are stationary and positioned one next to another continuously in both the lateral direction and the direction orthogonal thereto, which are the left-right direction (X) and the forward-backward direction (Y), respectively, in FIG. 2. Each docking cell has a cell ID ($DC_i$) representing the position of the docking cell in the building or framed structure 1.

Each docking cell 20 has therein at least one ground driving device 30 (FIGS. 7-9) affixed on the bottom 22 of the docking cell, one or more carriage position and ID sensors 40, and a docking cell control and interface unit (CIU) 80. The ground driving device 30 is adapted to drive a carriage 60 horizontally in different directions of a docking cell, as described hereinafter in further details. The bottom of a docking cell can be the floor of a building or a framed structure, or alternatively can be a planar supporting structure anchored on the floor of a building or a vessel.

Depending on the type of ground driving device 30 installed in a particular docking cell, a carriage 60 may be moved in two opposing directions, as illustrated by a pair of bars in FIG. 2 (hence also referred to as a two directional docking cell), or to be moved in four directions orthogonal to one and another, as illustrated by two pairs of bars in FIG. 2, (hence also referred to as a four directional docking cell). Most docking cells are four directional docking cells. A two directional docking cell can be used inside elevators, at locations that have space limitations, or at locations where the carriage only needs to be moved in two directions, such as a docking cell used as a transitional pass unit.

Figure 3:
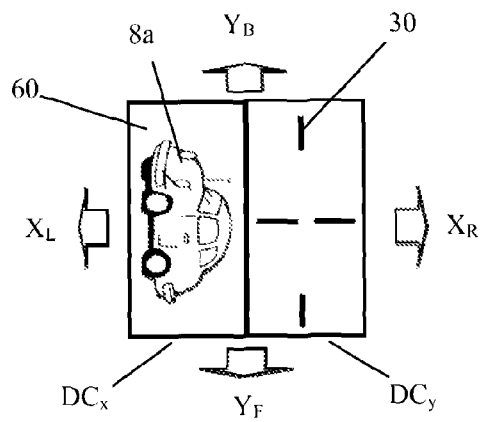
FIG. 3 is an illustrative view of moving directions of a carriage in reference to two neighboring docking cells.

FIG. 3 illustrates schematically two immediately adjacent docking cells, DCx and DCy, each having therein a ground driving device that enables moving a carriage 60 in four directions orthogonal to one and another. In FIG. 3, DCy is unoccupied and DCx is occupied by a carriage 60 loaded with a car 8a. In DCy, the pair of laterally oriented bars indicates a left-right driving mechanism, and the pair of vertically oriented bars indicates a forward-backward driving mechanism of the ground driving device 30. The ground driving device 30 is able to move carriage 60 loaded with car 8a in the left-right direction, as indicated by arrows $X_L$, $X_R$, and in the forward-backward direction, as indicated by arrows $Y_F$, $Y_B$ In one embodiment, each carriage 60 of the system comprises a planar platform having, on a lower side thereof, an engagement structure in mating relationship with the ground driving device 30 of each docking cell 20. Carriage 60 engages with the ground driving device 30 through its engagement structure, and is driven by the ground driving device 30 to move among the docking cells on a floor level. Each carriage has thereon a carriage identification ($C_i$) and at least one position tag 70 detectable by carriage position and ID sensors in each docking cell.

Figure 4A:
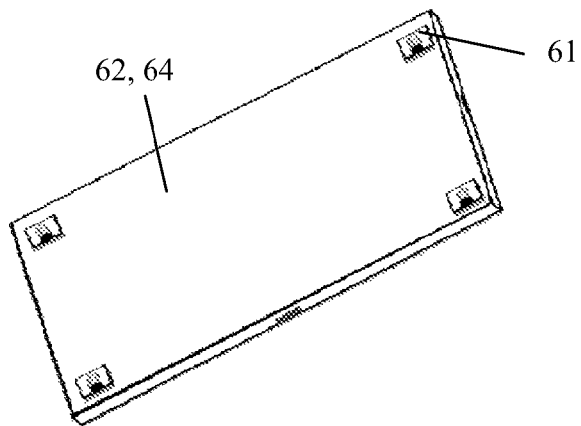
FIGS. 4A and 4B are perspective top and bottom views, respectively, of a carriage in one embodiment of the present invention.
Figure 4B:
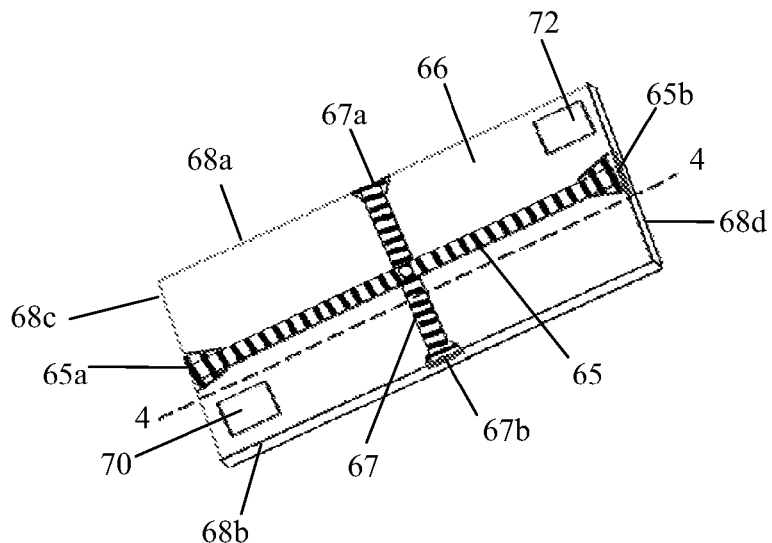
Figure 4C:
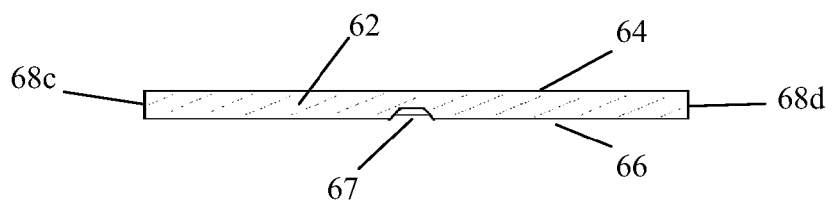
FIG. 4C is a cross-sectional view of the carriage along line 4-4 of FIG. 4B.

In one embodiment, the ground driving device 30 comprises one or more gear driving mechanism, and carriage 60 comprises one or more linear gear track in mating relationship with gears of the gear driving mechanism. FIGS. 4A-4C illustrate an exemplary embodiment of a carriage 60 that can be driven by a gear driving mechanism.

As shown in FIGS. 4A-4C, carriage 60 is in a form of a planar platform 62, having a top side 64, a bottom side 66, and four side edges 68a-68d. The planar platform 62 can be made of a heavy duty metal plate, or other suitable materials, which can carry the designed weight of an object. The planar platform 62 can be a single piece structure. The four corners of platform 62 may be constructed as round corners to reduce the likelihood of being caught by neighboring carriages during movement of the carriage. The top side 64 has a nonskid surface, and optionally has a plurality of hinges 61 for service lifting of the platform or tying the object onto the carriage.

In the embodiment shown, carriage 60 has two linear gear tracks 65, 67 on the bottom side 66, disposed orthogonal relative to each other. Gear track 65 is positioned along the longitudinal centerline of the platform, extending across the entire length of platform 62. Gear track 67 is positioned along the transverse centerline of the platform, extending across the entire width of the platform. Each gear track ends at the respective side edge of platform 62. Each liner gear track has two opposing open ends 65a,65b and 67a,67b, and each open end is in flush with the respective side edge of platform 62. As shown in the cross-sectional view of the platform 62 in FIG. 4C, each linear gear track recesses from the bottom side 66 into the platform 62 forming a groove, which has a tapered cross-sectional profile toward the top side 64 of the platform. The depth of the recess or the groove is to such an extent that the ridges of the linear gear tracks do not protrude from the surface of bottom side 66, so that carriage 60 can be easily moved on top of supporting wheels from one docking cell to another.

As shown in FIG. 4B, preferably both open ends (65a,65b and 67a,67b) of each gear track have a wider, or an enlarged opening toward the respective side edge of the platform, tapering inward in the longitudinal direction of the respective linear track. The wider open end facilitates gear bindings even when the gear positions are imperfect. This facilitates engagement of carriage 60 with the gear driving mechanism of an immediate neighboring docking cell during the movement of the carriage from one docking cell to another docking cell.

As further shown in FIG. 4B, carriage 60 has a position tag 70 and a carriage ID tag 72 positioned on the bottom side 66 of the platform. In one embodiment, position tag 70 can be a photo-reflector or simply a mechanical island, and carriage ID tag 72 can be a bar-coded photo-reflector that carries carriage identification ($C_i$) information. Both position tag 70 and carriage ID tag 72 can be detected by carriage position and ID sensors of the docking cell. Optionally, position tag and carriage ID tag can be combined together. Other suitable structures and configurations can also be used for the position tag 70 and carriage ID tag 72.

Figure 7:
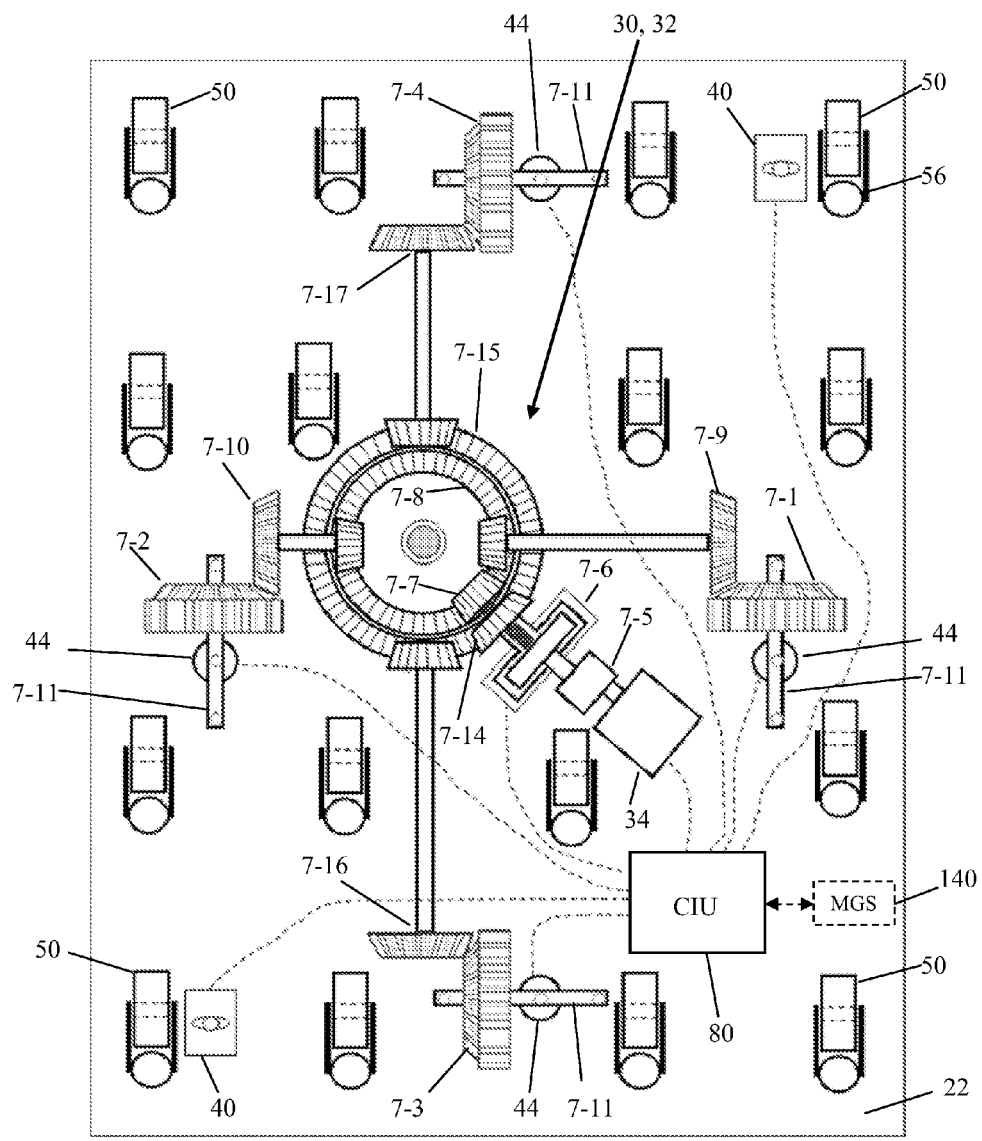
FIG. 7 is an illustrative top view of a four directional docking cell having a single motor gear driving mechanism in one embodiment according to the present invention.

FIG. 7 illustrates a four directional docking cell 20A ($DC_j$ in FIG. 2), in which ground driving device 30 includes a gear driving mechanism 32. Gear driving mechanism 32 includes a dual directional motor 34 and two sets of directional driving gears (7-1,7-2 and 7-3,7-4), each set being driven by dual directional motor 34 through gear case (7-5), dual transmission system (7-6), respective clutch gears (7-7 and 7-14), wheel gears (7-8 and 7-15), and transfer gears and shafts (7-9,7-10 and 7-16,7-17).

The operation of gear driving mechanism 32 is described in reference to driving a carriage 60 toward the direction "$X_R$" shown in FIG. 3 as an example. The drive is controlled by CIU of involved docking cells DCx and DCy, as commanded by the central management system (MGS) 140. CIU is further described hereinafter in reference to FIG. 6.

Now referring to FIGS. 3 and 7, carriage 60 loaded with car 8a is originally in docking cell DCx and is to be moved in direction "$X_R$" into docking cell DCy. Assuming the initial position of gear driving mechanism 32 is at its lockup position, in which both "$X_L$-$X_R$" directional driving gears (7-1, 7-2) and "$Y_F$-$Y_B$" directional driving gears (7-3,7-4) are all in their up position and engaged with both linear gear tracks of carriage 60. To drive carriage 60, the following actions are involved. First, brakes are released, if brakes are used. Then, "$Y_F$-$Y_B$" directional driving gears (7-3,7-4) are lowered or disengaged, dual directional motor 34 is empowered to rotate in one direction that is adapted to move the carriage to direction "$X_R$". The rotational torque of the motor is transferred to gear case (7-5), then through the dual transmission system (7-6) the rotation is transferred to clutch gear (7-7), which drives the wheel gear (7-8) to make clockwise rotation. Through transfer gears (7-9, 7-10) and their shafts, and possibly transitional gears, the rotation and torque of the motor is finally transferred to the set of "$X_L$-$X_R$" directional driving gears (7-1, 7-2), which in turn moves carriage 60 to the direction "$X_R$".

Furthermore, during the movement of carriage 60 in the direction "$X_R$" the gear driving mechanism 32 in docking cell DCy also performs the same activity described above to take in carriage 60. As controlled by the central management system 140, the gear driving mechanism 32 in these two immediate neighboring docking cells are synchronized to drive simultaneously in the same moving direction.

Similarly, if carriage 60 is to be moved to "$Y_F$" or "$Y_B$" direction, controlled by CIU, the dual transmission system (7-6) is switched to engage clutch gear (7-14). Then through wheel gear (7-15), the rotation torque of dual directional motor 34 is transferred to transfer gears and shafts (7-16, 7-17), which drives the "$Y_F$-$Y_B$" directional driving gear set (7-3, 7-4), and in turn moves carriage 60 in the selected direction.

In gear driving mechanism 32, all components are affixed to the bottom of the docking cell with necessary supports, bolts and bearings, except the two sets of directional driving gears (7-1,7-2, and 7-3,7-4) and their transitional gears and shafts (not shown). Each directional driving gear is connected to an up/down arm (7-11) which moves a directional driving gear up or down to engage or disengage with the gear tracks of the carriage. The up/down arm (7-11) is controlled by an electromagnetic or hydraulic up/down driver commanded by CIU 80. Each up/down arm (7-11) has an up/down position sensor 44 mounted on the arm, which communicates with CIU 80 of the docking cell. Position sensor 44 detects each directional driving gear's position and sends the information or feedback to CIU 80 of the docking cell.

The engagement of the stationary transfer gears (7-9, 7-10 and 7-16, 7-17) with the up/down directional driving gears (7-1, 7-2 and 7-3, 7-4) can be achieved by spring tensioned transitional gears or alternatively by gapped gears. Gapped gears herein refer to two gears that are in normal engagement when the directional driving gears are in the up position, while they stay in loose touch when the directional driving gears are in the down position.

Figure 5:
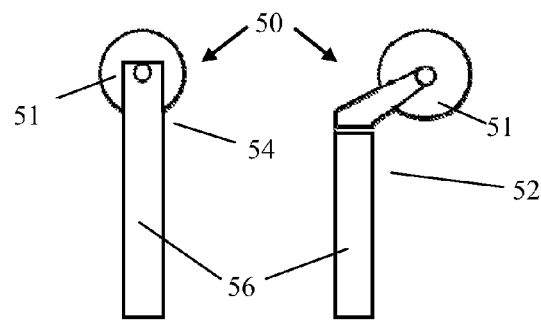
FIG. 5 is an illustrative view of a non-swivel supporting wheel and a swivel supporting wheel of the ground driving device.

As further shown in FIG. 7, the ground driving device 30 further includes a plurality of supporting wheels 50. A supporting wheel 50 is an assembly that includes a roller 51 rotatably mounted on its mounting pole or frame 56 (FIG. 5). The weight of a carriage and its object is supported by these supporting wheels during their storage in the docking cell as well as during the movement of the carriage into and out of the docking cell. The supporting wheels 50 are affixed at the bottom 22 of each docking cell, and are properly distributed within the docking cell to support the weight and movement of a loaded or unloaded carriage, so that the carriage can be stably moved on top of them. Each docking cell includes at least four supporting wheels 50. The supporting wheels are passive devices. Rollers 51 have a width and a diameter larger than the width of the linear gear tracks of carriage 60, so that rollers 51 can roll over the gear tracks at the bottom of carriage 60. Rollers 51 can be made of rubber or other suitable materials that are durable and have low noise. Supporting wheels 50 can be swivel wheels 52 shown in FIG. 5, which can be used in all types of docking cells of system 10, and can also be non-swivel wheels 54 which are only used in two directional docking cells of the system.

FIG. 7 further shows the position and carriage ID sensors 40 in docking cell 20A, which are in communication with CIU 80, as indicated by dotted line. Carriage position and ID sensors 40 of each docking cell are disposed at the bottom of each docking cell. In one embodiment, carriage position and ID sensors 40 are affixed to the bottom 22 of the docking cell, with the sensors positioned at a level approximate to the bottom side 66 of carriage 60. When the carriage is moved from one docking cell to the next docking cell, for example from DCx to DCy in $X_R$ direction as shown in FIG. 3, the position and carriage ID sensors 40 in docking cell DCy senses the carriage is in position by detecting the position tag 70 and a carriage ID tag 72 on the bottom side of carriage 60. CIU 80 of docking cell DCy then sends a real time status report to central management system 140 immediately to inform this carriage is in DCy, as such the ID association database is updated dynamically.

Figure 8:
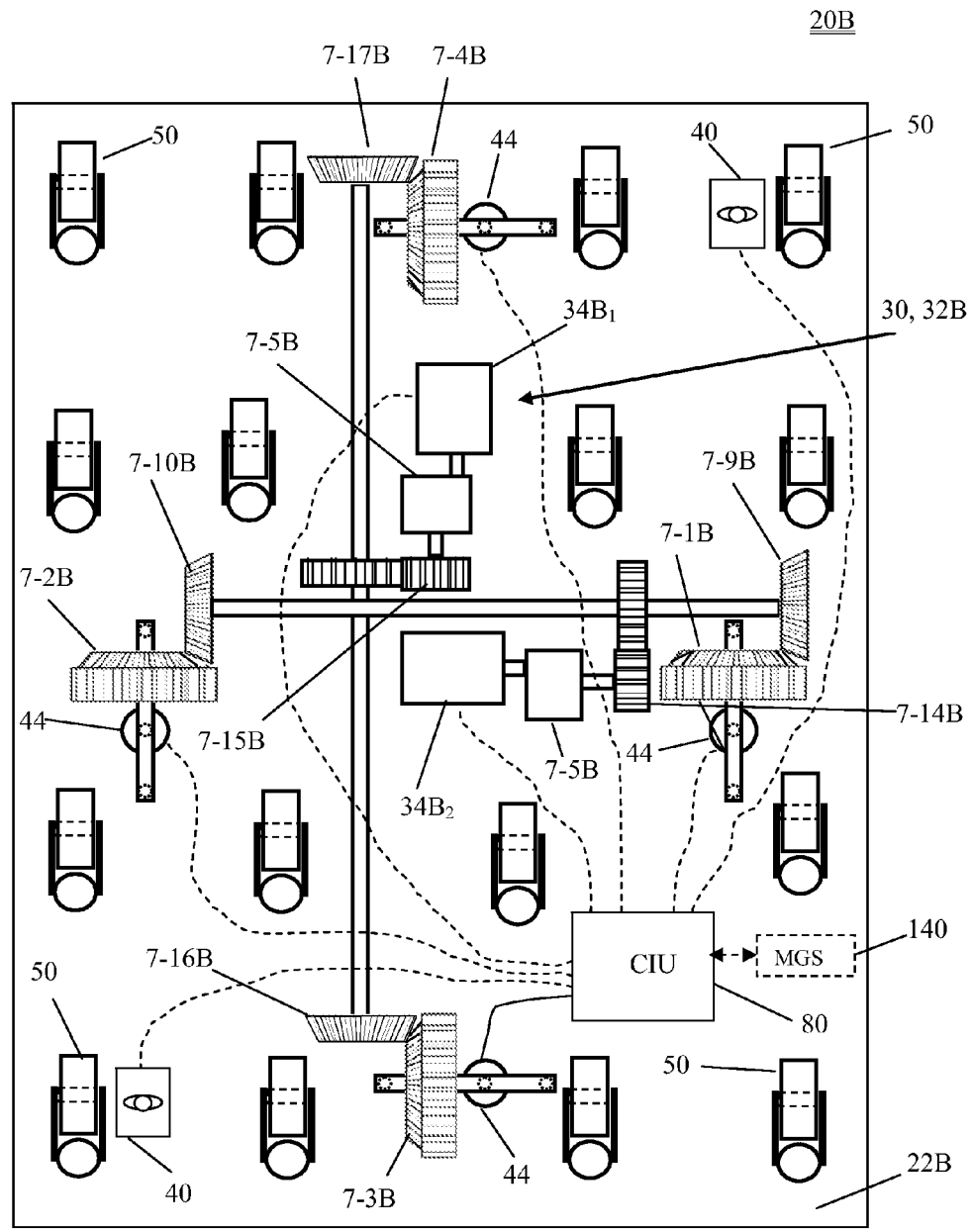
FIG. 8 is an illustrative top view of a four directional docking cell having a duel motor gear driving mechanism in one embodiment according to the present invention.

FIG. 8 illustrates an alternative embodiment of a four directional docking cell 20B having a gear driving mechanism 32B that has two independent sets of motors. This is a duel motor option vs. the single motor option described in FIG. 7. As shown in FIG. 8, gear driving mechanism 32B has two separate motors $34B_1$ and $34B_2$. Each motor is associated with its own gear case (7-5B), clutch gear (7-14B or 7-15B), transfer gears (7-9B,7-10B or 7-16B,7-17B) and directional driving gears (7-1B,7-2B, or 7-3B,7-4B). Motor $34B_1$ drives the directional driving gears (7-3B,7-4B) to move a carriage engaged thereon in direction "$Y_F$-$Y_B$", and motor $34B_2$ drives the directional driving gears (7-1B,7-2B) to move the carriage in direction "$X_L$-$X_R$", in reference to FIG. 3. Therefore, gear driving mechanism 32B enables to move a carriage 60 in the docking cell in four directions orthogonal to one and another.

As further shown in FIG. 8, same as in docking cell 20A, docking cell 20B has a plurality of supporting wheels 50 affixed to the bottom 22B of the docking cell, and two position and carriage ID sensors 40.

Figure 9:
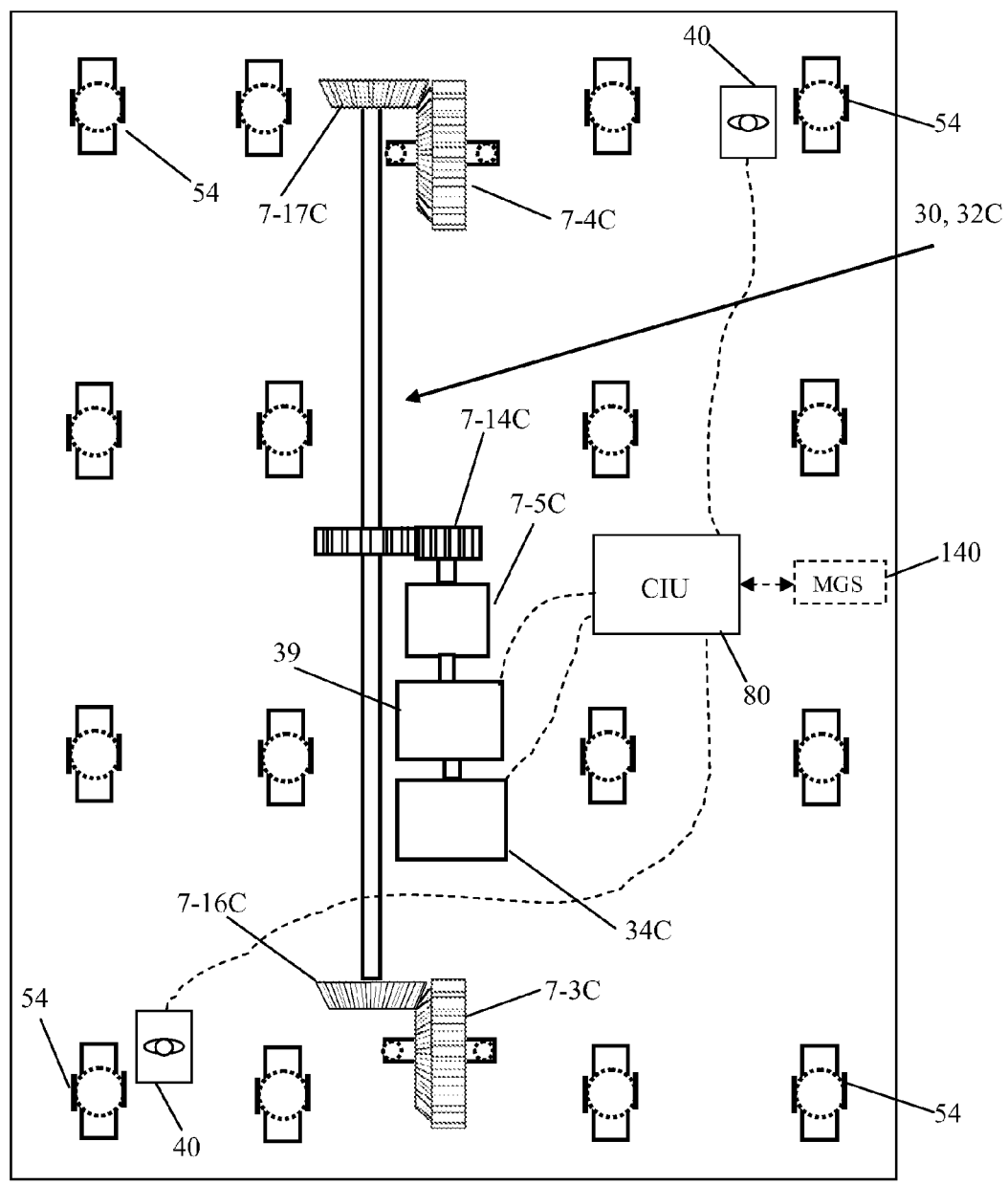
FIG. 9 is an illustrative top view of a two directional docking cell having a gear driving mechanism in one embodiment according to the present invention.

FIG. 9 illustrates an embodiment of a two directional docking cell 20C which has a gear driving mechanism 32C. As shown, motor 34C is associated with gear case (7-5C), clutch gear (7-14C), transfer gears (7-16C, 7-17C) and directional driving gears (7-3C, 7-4C). Motor 34C drives the directional driving gears (7-3C, 7-4C) to move a carriage engaged thereon in direction "$Y_F$-$Y_B$", in reference to FIG. 3. Therefore, gear driving mechanism 32C enables to move a carriage 60 in docking cell 20C in two opposing directions. Similarly, the same type of two directional gear driving mechanism can be arranged in a docking cell to move a carriage in "$X_L$-$X_R$" direction, in reference to FIG. 3.

Different from driving mechanism 32 and 32B, gear driving mechanism 32C has only one set of gear system, and no up/down arms and corresponding up/down position sensors are needed. In gear driving mechanism 32C, a clutch brake system 39 is provided for locking the gears to prevent carriage sliding.

Docking cell 20C further includes a plurality of supporting wheels. Because this is a two directional docking cell, non-swivel supporting wheels 54 are used. The supporting wheels 54 are arranged in the "$Y_F$-$Y_B$" direction to support the carriage engaged thereon during its movement in the "$Y_F$-$Y_B$" direction, in reference to FIG. 3. If a docking cell 20C is for moving a carriage in the "$X_L$-$X_R$" direction instead, the supporting wheels 54 are arranged in the "$X_L$-$X_R$" direction. Docking cell 20C can be used in elevators, hallways, or other areas where only two directional movement of the carriage is allowed or needed. In the gear driving mechanisms shown in FIGS. 7-9, reversible motors with brake controls are used. It is noted that FIGS. 7-9 described above are used to illustrate the working principle of the functional docking cells and the drawings may not be properly scaled.

Figure 6:
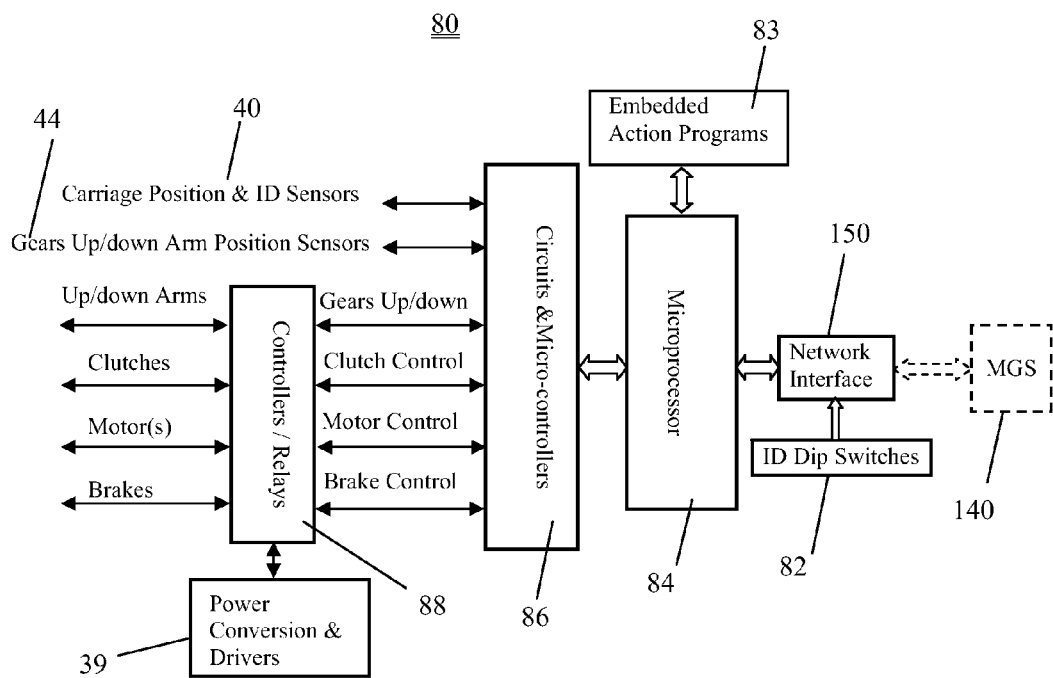
FIG. 6 is a diagram illustrating the components and operation of a docking cell control and interface unit (CIU) in one embodiment according to the present invention.

Each docking cell 20 has its own docking cell control and interface unit (CIU) 80. FIG. 6 illustrates some components and operation of CIU 80. As shown, CIU 80 includes ID dip switches 82, a module 83, microprocessor 84, microcontroller 86, and a controller/relay group 88.

ID dip switches 82 assign a unique identification ($DC_i$) to the docking cell as its address, which identifies a particular docking cell within the facility and this ID number is stored in the database of DC physical map in the facility databases of central management system (MGS) 140.

Module 83 includes embedded action programs, which are a series of pre-programmed action instructions according to each received command from MGS 140 or from this docking cell's own status. Microprocessor 84 executes these action programs and analyzes status of the docking cell. Microcontroller 86 provides logic and circuitry to receive and process signals from carriage position and ID sensors 40 and up/down arm position sensor 44 of the directional driving gears, and to send control signals to the controller/relay group 88. Controller/relay group 88 provides electrical isolation of logic circuits to power circuits, which is in communication with power conversion and drivers 39. Power conversion and drivers 39 provide necessary power to the gear driving mechanism 32, including up/down arms, motors, clutches, brakes, and etc.

Figure 12:
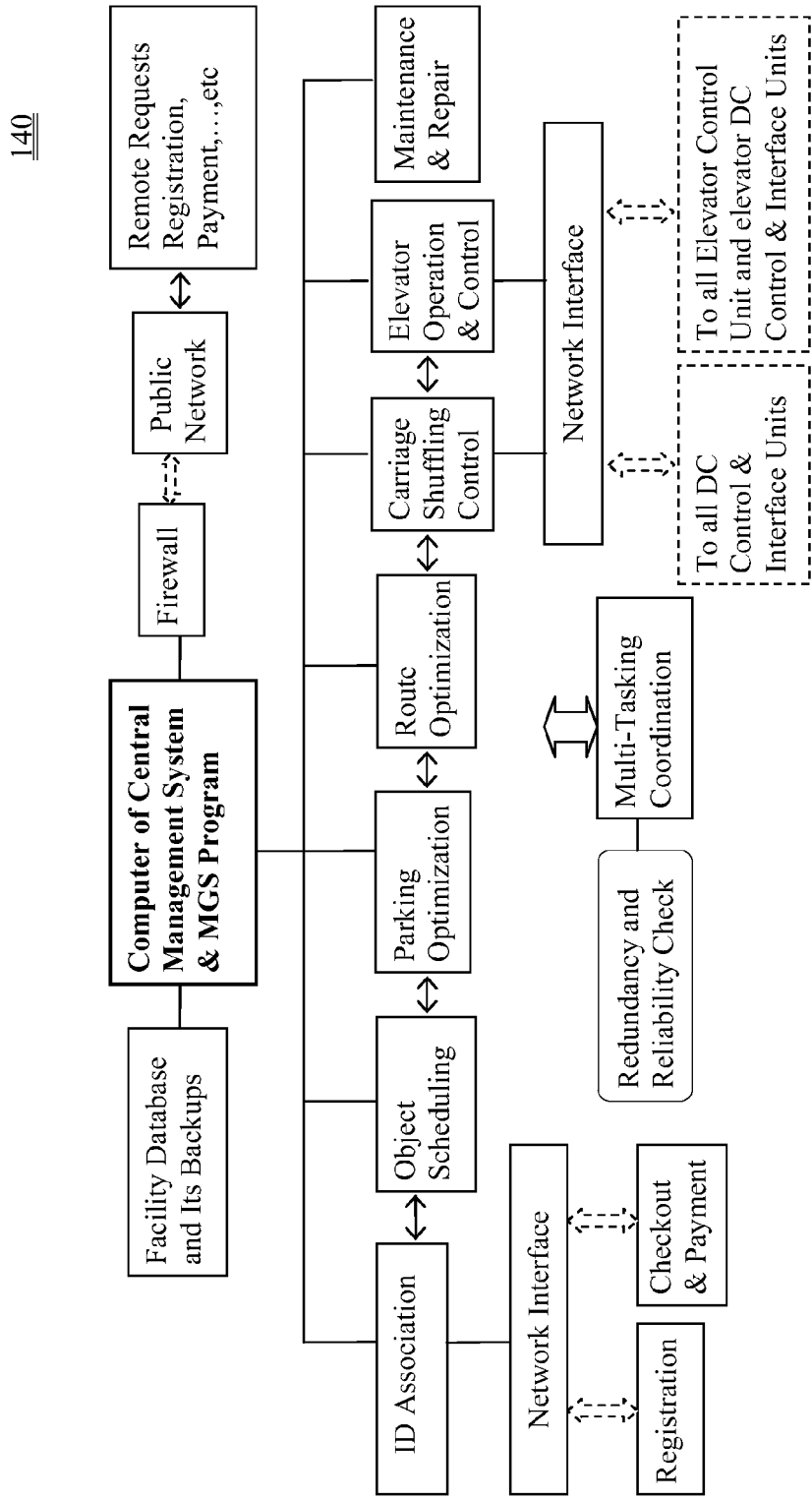
FIG. 12 is a diagram illustrating the central management system (MGS) with functional modules and their communications in one embodiment according to the present invention.
Figure 11:
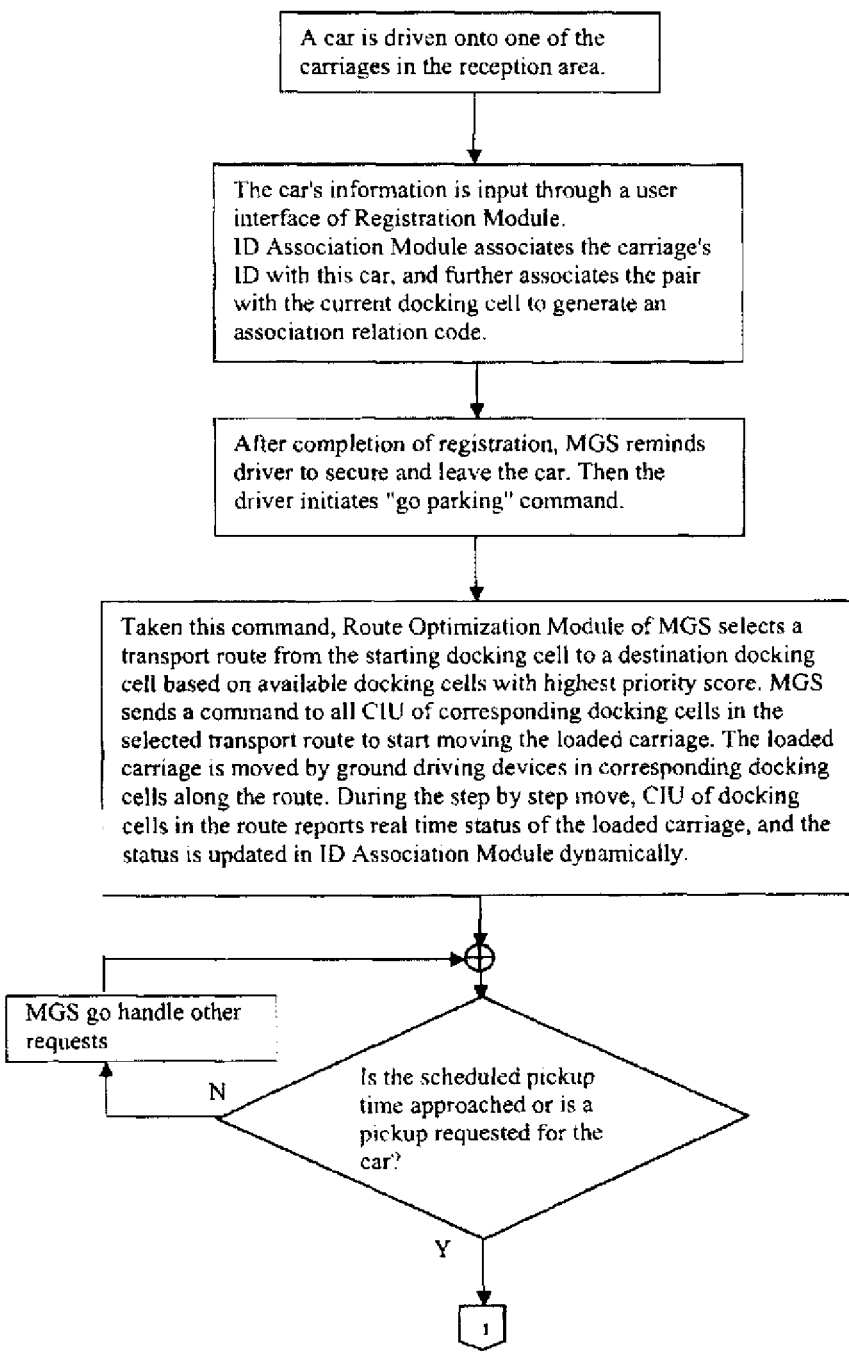

As further shown in FIG. 6, CIU 80 communicates through a network interface 150 with MGS 140, to receive commands from MGS 140 or send the status of the docking cell to MGS 140. Network interface 150 in FIG. 6 and its counterpart network interface in MGS in FIG. 12 provide a gateway for communications between the central management system and all docking cells, elevators, and subsystems. The network interface can use existing network configurations, for example, Ethernet.

A command from MGS 140 has specific formats, which include, but not limit to, target address, target direction, target steps, and status request. A status report from CIU and an elevator control unit, as described below, also have specific formats, which include, but not limited to, origin address and status report. A command from MGS 140 can be sent to the entire network within the facility, it is then decoded by each CIU or elevator control unit. Only the corresponding CIU or elevator control unit with matched address set in its ID dip switches will respond to this command, and this command activates corresponding program(s) within the CIU or elevator control unit to perform demanded actions within the corresponding docking cell or elevator. After completion of the demanded actions, the CIU or elevator control unit sends status report through the network interface to MGS 140. Moreover, a specifically designated command package can be used by MGS 140 to send software upgrades to perform upgrades to the embedded programs in CIU and in the elevator control unit.

In the embodiment shown in FIG. 1, the automatic stacked storage system 10 further provides two elevators for transporting an object among different levels of building 1. Each elevator includes an elevator shaft 110, an elevator car 120, elevator drive unit, and an elevator control unit. The elevator shaft, elevator car and the elevator drive unit can be the same as those used in a conventional elevator, such as service elevators. The elevator control unit includes one or more microprocessors and one or more software programs, and controls operation of the elevator. In the embodiment shown in FIG. 2, elevator car 120 has a two directional docking cell 20 mounted on the floor of the elevator car, hence docking cell 20 in the elevator is stationary to the elevator car 120. The docking cell in the elevator is also referred to as elevator docking cell.

Elevator car 120 can have more than one docking cells, for example two docking cells arranged side by side or aligned along their longitudinal axis, and the elevator car can have one door or two opposing doors. This provides the elevator with a high transportation capacity, particularly beneficial in heavy traffic facilities. Each docking cell in the elevator has the same structural components of the docking cells on the floor, namely, ground driving device 30, position and carriage ID sensors 40, and CIU 80. The elevator docking cell can be either a two directional or a four directional docking cell, depending on the configuration and need of a parking or storage facility.

System 10 can have one or more elevators for transporting an object among different levels of a building if the storage facility has more than one floor or stack levels. System 10 is versatile in its structure blueprint and each floor does not need to have the same structural layout. Not all elevator shafts need to be from the first floor all the way to the top floor. For example, one of elevator shafts can be from the ground floor only to the second floor, which has the shortest distance from the ground floor and potentially receives objects more frequently. Such a designated elevator in heavy traffic areas can release other elevators for transporting carriages to higher floors, and enhance overall efficiency of the facility. Moreover, the elevator shaft can be located either in the interior or exterior of the building depending on the available space and efficiency requirements. The elevator shaft can have either a closed or open structure.

In an alternative embodiment, the elevator can have an escalator structure, with docking cells mounted on the steps of the escalator. This structure can be used in heavy traffic parking or storage facilities.

Moreover, the automatic stacked parking or storage system 10 may further include a carriage holding bay 130 for storage of unused carriages, see FIG. 2. In one embodiment, carriage holding bay 130 is a vertical shaft that can automatically stack many carriages vertically by a mechanical lifting system which is also controlled by the central management system 140. Unoccupied carriages can be moved to the holding bay 130. Alternatively, unoccupied carriages may be moved back to the reception area, or to other unoccupied docking cells. In an alternative embodiment, system 10 has a carriage lifting device for storing unused carriage or general maintenance services. The carriage lifting device can stack unused carriages together and place the stacked carriages as an object onto a working carriage, which can then be moved and parked in a designated docking cell. The carriage lifting device can be stationary, positioned next to a docking cell, or portable among different locations of a floor and different floors.

As further indicated in FIG. 2, the automatic stacked parking or storage system 10 includes a reception station 90, where the users drop off and pick up the object such as a car. The reception station 90 may have more than one section for interacting with users. For example, reception station 90 may have one section or zone designated for dropping off cars, and another section or zone 96 designated for picking up the cars. In each section of the reception station 90, there are one or more user interfaces for receiving user and/or storage information. At the time of dropping off an object, such as parking a car, the user, such as a driver, enters prerequisite information into the user interface, such as user identification, car information, and projected pickup time. The user may also input preferred parking area and optional services, such as car cleaning. A pickup section may have an exit user interface for receiving the storage information for pickup. The user interfaces are components of a registration module of the central management system as described below.

The central management system 140 comprises at least one computer including one or more MGS program, and multiple functional modules which includes, but not limited to, one or more databases, registration module, ID association module, object scheduling module, parking optimization module, route optimization module, carriage shuffling control module, multi-task coordination and redundancy/reliability check module, elevator operation control module, firewall module, checkout/payment module, or maintenance/repair module. Some of these modules are only software programs, and some of these modules include software programs and hardware components. The software modules are relatively independent in their functions, and mostly interchange information through the databases rather than through program variables. Some software modules, such as the parking optimization module and the route optimization module described below, may involve artificial intelligence in its analysis and decision making.

The MGS program performs non-stop operations of watch-dog and communications. It monitors requests and status changes from each CIU, elevator control unit and subsystems, updates corresponding databases, communicates with functional module(s) or subsystems, and sends commands to each CIU and elevator control unit.

FIG. 12 illustrates the functional modules of the central management system 140 and their interactions. The individual functional modules are described hereinafter.

1.) Databases. Databases may include facility databases, user information databases, real time databases, as well as their backups. Facility databases store facility structural physical parameters, area and equipment assignment, device setting, and identification information of the facility; each docking cell's physical and topographic coordinates, and system administrative information; docking cell's type, such as two directional or four directional information, docking cell's ID (set by each dip switch shown in FIG. 6), and each docking cell's indexes for its movement directions; physical and topographical coordinates and ranges of the elevators, and other suitable information. The user information databases store user, such as driver's identification information and object's information. It can also include driver's membership and their account balance information. Facility databases and user information databases are general purpose database.

A real-time database is a processing system designed to handle workloads whose state is constantly changing. This differs from traditional databases containing persistent data, mostly unaffected by time. Real-time processing means that a transaction is processed fast enough for the result to come back and be acted on right away. In MGS 140, the real time databases include a dynamic ID association database for storing real time location information of each object-carriage pair relative to docking cells; dynamic status database for the status of each docking cell including the docking cell in elevator(s), and the status of each carriage; dynamic database of elevator car locations and status; priority score database for docking cells and elevators assigned by parking optimization module, and other working databases. The real-time databases are updated dynamically. The database backup is operated in battery powered system, which backups the working database at scheduled intervals, or continuously to prevent data loss in case of power loss in the facility.

Herein, the status of a docking cell may typically include occupied by a carriage, unoccupied, reserved, and out of service. The status of elevator may typically include occupied by a carriage going up, occupied by a carriage going down, unoccupied no mission, unoccupied with mission, and out of service. The status database is dynamically updated according to a real time status report from the CIU of each corresponding docking cell and elevator control unit, or by the MGS program.

2.) Registration module. The registration module can be a subsystem that provides access to multiple drivers or users at the same time for requesting storage service, working together with central management system 140. The object and/or driver's ID information are collected either from manually entered data or from card scanned data entered at the user interface at the reception station.

3.) ID association module. The ID association module comprises one or more software program and an ID association database. The software program groups identifications of an object and the carriage on which the object is situated as a pair, and further associates the pair with the docking cell in which the pair is situated to generate an association relation code, namely object(driver)<->carriage<->DC. The ID association database stores the association relation code associated with each corresponding docking cell. The ID association database is a real time data base, which is updated dynamically according to real time reports from the CIU of each corresponding docking cell in the system.

In operation, when a "go parking" command is initiated by the driver through the registration module, the ID association module pairs the object with the carriage on which the object is situated and associates the pair with the current docking cell. The association relation database is dynamically updated when the loaded carriage is moved into another docking cell. Therefore, this module constantly monitors where the objects are located at the current time.

4.) Object scheduling module. This module is responsible for handling the scheduled parking and release of objects based on pre-set date and time.

5.) Parking optimization module. This module generates a relatively static priority score database of the docking cells. The priority score database can be updated automatically based on preset conditions, or manually as needed. To assign a priority score to each docking cell involves topographic analysis of the facility layout and elevators, whether/or not having carriage holding bay or bays, consideration of time and economic factors, pre-determined reserved spots, consideration of object release schedule, maintenance, consideration of factors in facilitating route optimization, and minimizing the need of carriage shuffling. A higher score is given a higher priority in the route selection or optimization process. The intuitive result, for example, is that higher scores are assigned to those docking cell units at lower level of a building and those close to elevators, and lower scores are assigned to those in a corner at a higher level of the building and those located at main pathways where carriage shuffling may be required. It should be understood that a higher score can be expressed by any suitable mathematical expressions, for example, by positive or negative numbers, integer or fraction.

Herein, the term "carriage shuffling" refers to moving one or more carriages from their existing docking cells to different docking cells in order to free a pathway so that an assigned carriage can be moved to a destination docking cell, which is also referred to as a destination spot.

6.) Route optimization module. This module is responsible to select a route, also referred to as a transport route, to park an object to a dynamically chosen destination docking cell using one or more route optimization algorithm. In one embodiment, route optimization module has a route optimization or selection algorithm based on method of simulated annealing which searches for a minimum mathematical objective function of two or more weighted variables. The objective function (f) is defined by equation (1):

$$f = \text{sum of weighted penalty variables} - \text{sum of weighted reward variables} \quad (1)$$

The penalty variables may include, but not limited to, traveling distance, time or cost involved in a step involved in moving a loaded carriage to the destination docking cell, number of docking cells involved in carriage shuffling in the step in order to move the loaded carriage to the destination docking cell, or waiting time, traveling time, or cost involved in using one or more elevators. The reward variables may include reward factors associated with a step or a route that provides one or more benefits, such as reward point for sharing an elevator with another car, reward point for a route avoiding areas under maintenance of the facility, reward point for a route passing a car wash or a maintenance station when the driver of the car requested such a service before picking up the car, reward point for using an area more suitable for long term parking in a particular facility, and etc.

In one embodiment, two penalty variables are the physical distance involved in transporting a loaded carriage to a destination docking cell, and the extent of docking cell shuffling involved in moving a loaded carriage to the destination docking cell. Other penalty variables may involve elevator use, and other suitable penalty factors involved in moving a loaded carriage to a destination spot, which may vary depending on the facility and the field of use.

In one embodiment, the objective function (f) is defined by equation (2):

$$f = \sum_{i=1}^{I} d_i^{\delta} + \sum_{i=1}^{I} m_i^{\sigma} + \sum_{j=0}^{J} t_j^{\alpha} + \sum_{k=0}^{K} p_k^{\beta} - \sum_{n=0}^{N} w_n^{\gamma} \quad (2)$$

wherein $d_i$ is a traveling distance in step i involved in moving a loaded carriage from a starting location to a destination docking cell; $m_i$ is number of docking cells in step i which would be involved in carriage shuffling in order to move the loaded carriage to the destination docking cell; $t_j$ is the estimated waiting time for an elevator in leg j of involved elevator use; $p_k$ is another penalty factor in step k; $w_n$ is a reward factor in step n; and $\delta$, $\sigma$, $\alpha$, $\beta$ and $\gamma$ are predetermined weights. Herein, a step is defined as a movement of a carriage from one docking cell to an immediate neighboring docking cell in any given direction, such as from DCx to DCy illustrated in FIG.

3. Weight δ, σ, α, β or γ gives an importance factor to the corresponding variable, which can be determined empirically.

In equation (2), if no elevator is involved in the route optimization, such as in a one story facility, J=0 and $t_0$=0. Similarly, if no penalty factor $p_k$ is involved in the route optimization, K=0 and $p_0$=0; and if no reward factor $w_n$ is involved, N=0 and $w_0$=0. Herein, all variables can be expressed as unitless factors.

In one particular embodiment, the objective function (f) defined by equation (2) is reduced to equation (3) below:

$$f = \Sigma_{i=1}^{I} d_i^{\delta} + \Sigma_{i=1}^{I} m_i^{\sigma} \qquad (3)$$

wherein $d_i$ is a traveling distance in step i involved in moving a loaded carriage from a starting location to a destination docking cell; $m_i$ is number of docking cells in step i which would be involved in carriage shuffling in order to move the loaded carriage to the destination docking cell; and δ and σ are predetermined weights. Herein, both variables have the same number of terms, namely, i=1, 2, . . . , I. As can be readily understood, in this embodiment no elevator is involved, which is a common situation for a one story parking or storage facility, or optionally the elevator is not considered as a factor in a simplified embodiment. Moreover, no other penalty variables or reward variables are considered in the route selection in this simplified embodiment.

For parking, the route optimization module first finds a destination spot by searching one of unoccupied docking cells having a high score in priority score database assigned by parking optimization module. Then, the route optimization algorithm finds the minimum value or one of minimum values of the objective function by either searching all nearby routes, such as along a geometrically shortest route, from the starting docking cell to the destination docking cell, which may potentially include elevators, or by exhausting all possible routes from the location of the starting docking cell to the destination docking cell. Nominal integers could be used for distance or time to facilitate numerical or topographic analysis in carriage shuffling and route selection. For release of a parked car, the process is the same as in parking, except that the destination spot is determined based on available docking cells in the pickup zone of the facility.

7.) Carriage shuffling control module. After a transport route is selected by the route optimization module, the carriage shuffle control module performs the actual carriage shuffling control and monitors step by step the movement of the carriage from the starting docking cell to the destination docking cell in the route. During the process of moving a loaded carriage from its starting docking cell to the designated docking cell, the operations of the ground drive devices in the docking cells in the transport route are coordinated in order to drive the carriage along the route. Moreover, during the process the carriage shuffling control module may move one or more already parked carriages away from their existing docking cells along the transport route to make the route available for the passing carriage. The carriage shuffling control module informs MGS program to send command(s) to one docking cell to move its carriage, or to multiple docking cells to move their carriages simultaneously, or in an arranged sequence.

8.) Elevator operation control module. This module controls and monitors the operation of elevators by elevator specific formatted commands. Based on a route selected by the route optimization module, the MGS program instructs elevator operation control module to work together with the carriage shuffling control module in a timely manner to control the elevator to go to the selected level on the route, and the MGS program commands corresponding elevator docking cell(s) to take in or send out a carriage.

9.) Maintenance/repair module. This module is used to provide manual controls to all docking cells and elevators, and to detect, troubleshoot and repair problems. It can change the status of a non-working docking cell, carriage or an elevator to out of service status, and vice versa in the status database. A unit (docking cell, carriage or elevator) with an out of service status will not be used in object scheduling and route optimization calculation.

10.) Firewall. Preferably, firewall is used to safeguard the central management system and databases while providing access to the system from public networks or wireless networks to submit orders and other service requests.

11.) Checkout/payment module. This module can be a subsystem networked with the central management system to provide access to the system for multiple drivers at the same time. When an object is picked up and checked out, this module informs the central management system to change the status of the corresponding carriage to unoccupied in the status database, then the corresponding carriage can be moved to the reception area or moved to the holding bay.

12.) Multi-task coordination and redundancy and reliability check module. The system 10 regularly deals with multiple tasks simultaneously, and controls many parking and releasing at the same time. This module performs the coordination task, and it ensures no collisions or conflicts in carriage shuffling, and maximizes the use of elevators and minimizes the carriage shuffling. Optional redundancy and reliability check can check the carriage's ID when a carriage is in a lockup position using the carriage position and ID sensors in each docking cell. The redundancy and reliability check module provides a redundant real time check to locate objects in case of power glitch or program anomaly, which further ensures accuracy of the object-carriage's locations in the ID association database.

As further shown in FIG. 12, the central management system further includes a network interface, through which and the network of the system, the central management system communicates with CIU of all docking cells, the elevator control unit, and any other subsystems. Same as the network interface 150 shown in FIG. 6, the network interface of the central management system can use existing network configurations, for example, Ethernet.

The above describes each module's functionality in the operation of the central management system. Optionally, the central management system can bypass the regular process performed by parking optimization module and route optimization module. For example, if a user has a regularly reserved parking spot, the central management system can use a predetermined route, without carrying out further parking optimization and route optimization. In this situation, the central management system ensures the route is available, or adjusts the route based on the availability. This avoids unnecessary repetitive calculation and ensures operation efficiency. The bypass option is suitable for private parking assignment or optional services to the facility users. Such option is also suitable when the present system is alternatively used in a facility involving library, luggage transportation, package sorting or assembling line.

Figure 10:
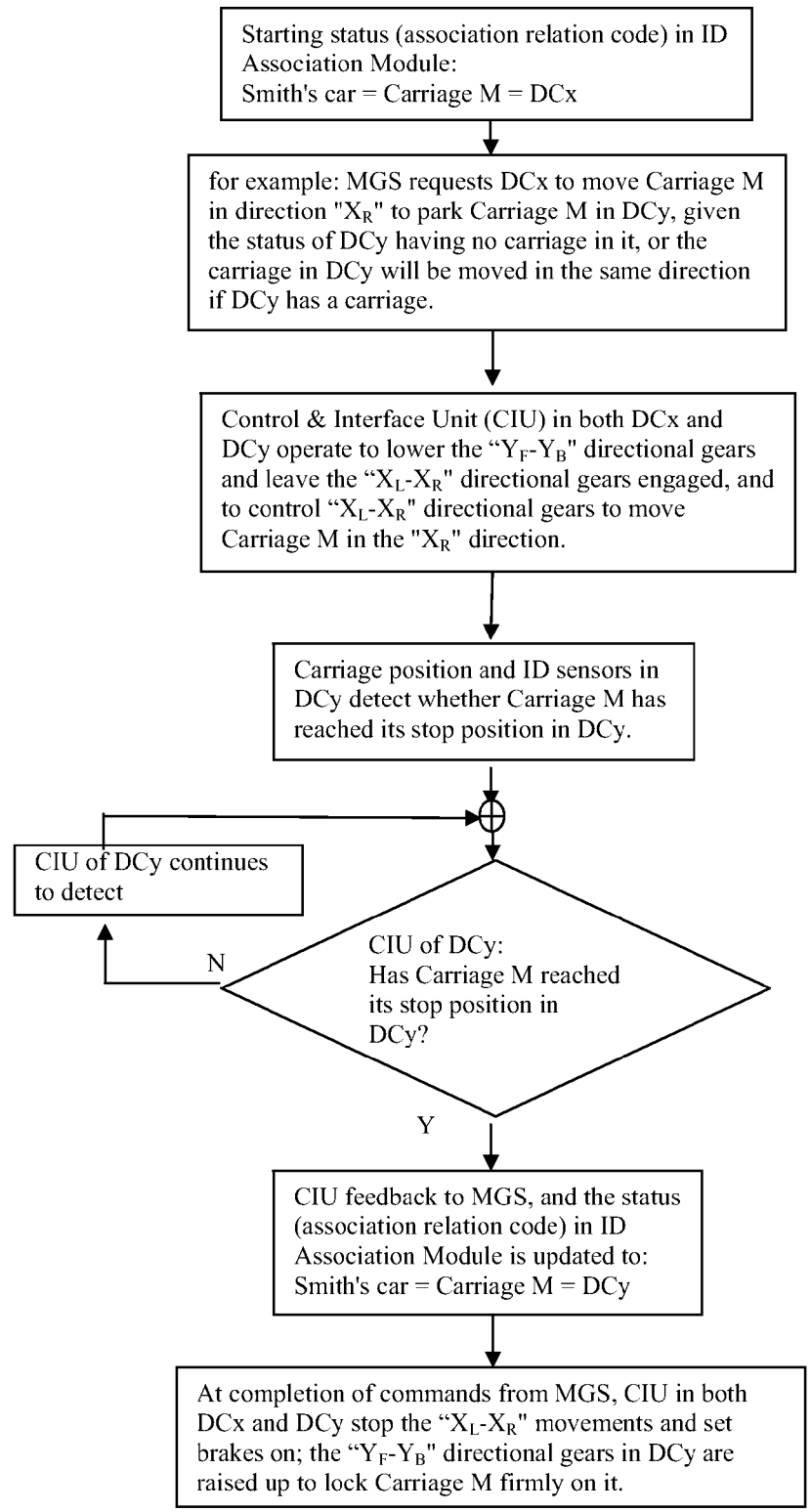
FIG. 10 is a flow diagram illustrating an example of the operation in parking a car in the parking facility in one embodiment according to the present invention.

The operation of the system is further illustrated in FIG. 10 with a flowchart, using an example of moving a carriage M that carries Smith's car in two adjacent docking cells DCx and DCy shown in FIG. 3.

Figure 11:
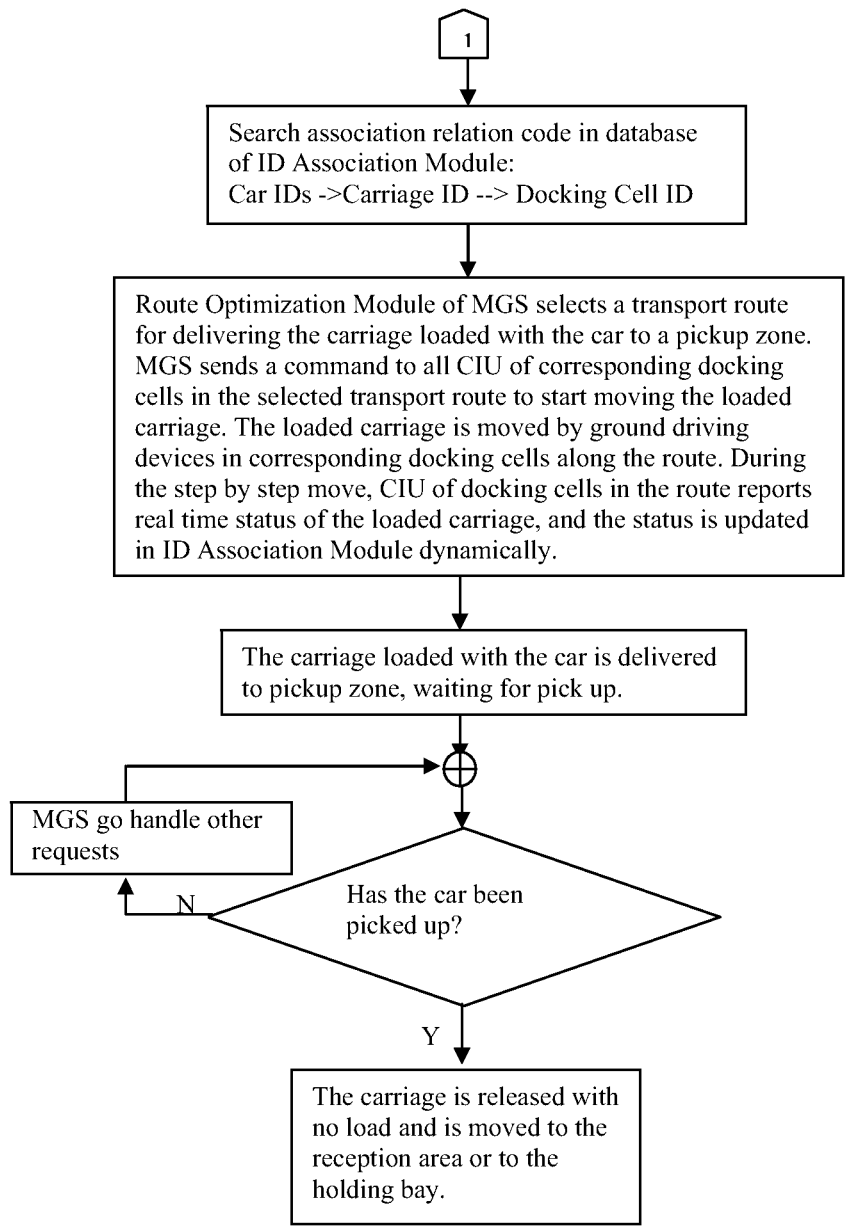
FIG. 11 is a flow diagram illustrating a general process involved in parking and retrieving a car in the parking facility in one embodiment according to the present invention.

FIG. 11 further illustrates using a flowchart an overall process involved in parking a car in the automatic stacked parking system and to retrieve a car from the docking cell for pick up.

The automatic stacked storage system of the present invention is particularly advantageous. Different from existing systems which require fixed blueprints of a building structure, the present system is versatile in its structure blueprint and can be designed to fit with most common building structures and spaces. Each floor does not need to have the same layout. Old buildings can be readily converted into the present parking or storage facility. As discussed above, elevator designs are flexible and have numerous options to accommodate structure, space and functional needs.

The present system is scalable, which can be built inside or outside of a building, in a frame structure, or on a vessel, such as cruise ship or aircraft carrier. The system can be single or multi-level, and can be constructed in a basement or in a form of a high rise building. The parking facility can be built into the living quarters of a condominium with private parking space, or as a common ground floor parking facility in a commercial or residential building. Moreover, the system operates only using the ground driving devices and does not require top or side driving mechanisms. This further reduces requirement to the surrounding structure, such as availability of weight bearing structural components and compatibility with surrounding structural configuration.

As a distinct feature, the present system can transport multiple objects at the same time within a facility for parking or retrieval without conflict. In such a multi-task operation, each transport route can be independent from others, or some transport routes may partially overlap with one and another or passing one through another, yet transportation of the loaded carriages is coordinated smoothly by the central management system. For example, a loaded carriage may be commanded to be on hold temporarily in one or more steps within its transport route to wait for clearance of the route. This maximizes object delivery efficiency and is particularly advantageous for high capacity facilities that have heavy traffic demands. Herein, heavy traffic refers to frequent parking and retrieving activities, as well as handling multiple parking, retrieving, or both at the same time. Further, because of the operational flexibility, the system provides highly efficient transportation while maintains maximum storage space usage.

The present system is particularly tolerant to operating conditions of structural components of the system which are involved in transportation of an object, or in other words has a high false tolerance. In a situation of one or more docking cells out of service, either due to malfunction or under maintenance, the central management system can easily route a carriage around non-working docking cells. The central management system can also easily reroute a loaded carriage if malfunction occurs in the initial selected route. Such an operational flexibility minimizes operation down time, and ensures overall system efficiency.

On the other hand, the system is reliable due to structural simplicity of the carriages and the ground driving device. The carriage is a passive moving component that does not have onboard driving device. This reduces potential failure of a weight bearing moving component and minimizes maintenance. The ground driving devices are stationary, which reduces likelihood of driver failure because of disassociation of driving device from a weight bearing moving component. Moreover, the ground driving device in each docking cell mechanically operates independently, without relying on a centralized driving system or other nearby driving devices. Therefore, malfunction of a ground driving device in one docking cell does not affect overall operation of the system, since the transport route can be rerouted automatically according to the docking cell's status to bypass the nonfunctional docking cell.

The present system is maintenance and repair friendly. If repairing or maintaining a functional and occupied docking cell is needed, the loaded carriage can be conveniently moved to the next available docking cell. If repairing or maintaining an occupied, but nonfunctional docking cell is needed, the parked car can be driven away from its carriage to the carriage in the next docking cell. As such, minimum effort is involved in removing a car from a nonfunctional docking cell, which avoids potential delay in picking up the car, or delay in repairing the docking cell. Moreover, the ground driving device has easy access for maintenance, without lifting device, or support platform as needed in a lift operated system or a top driven system.

On the other hand, construction of the present system is substantially less costly in comparison to the existing stacked parking system using robotics due to its hardware structural simplicity and versatility in the blueprint. The carriage and docking cells can be constructed as standard and interchangeable units. Auxiliary services, such as car cleaning or maintenance, can be conveniently added into the facility. For example, a car cleaning station is provided near the reception station or its pickup section. Prior to the prescheduled retrieving time, the central management system commends transporting the carriage with the parked car to the cleaning station based on the user's required service, and commends transporting the carriage to the reception station or its pickup section after cleaning.

While the present invention has been described in detail and pictorially shown in the accompanying drawings, these should not be construed as limitations on the scope of the present invention, but rather as an exemplification of preferred embodiments thereof. It will be apparent, however, that various modifications and changes can be made within the spirit and the scope of this invention as described in the above specification and defined in the appended claims and their legal equivalents.

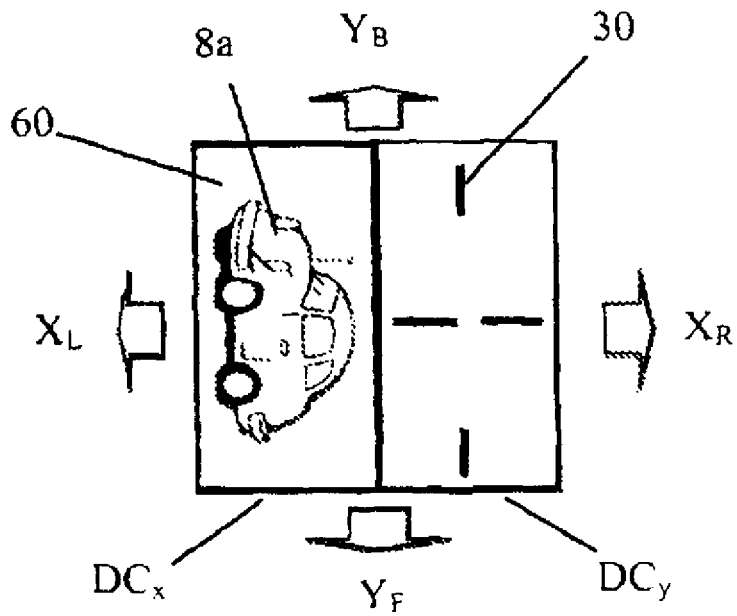

What is claimed is:

1. An automatic stacked storage system for parking or storage, the system comprising:
   (a) a plurality of stationary docking cells positioned one next to another continuously in a lateral direction and a direction orthogonal thereto on a floor of a building or framed structure; each docking cell comprising a cell ID representing an address thereof in said building or framed structure; wherein each docking cell comprises:
   at least one ground driving device affixed on a bottom of the docking cell for driving a carriage engaged thereon in different directions of the docking cell horizontally;
   a docking cell control and interface unit (CIU) comprising at least one microprocessor and one or more operating programs for controlling an operation of said ground driving device; and,
   one or more carriage position and ID sensors in communication with said CIU;
   (b) a plurality of said carriages, wherein said carriages are driven by the ground driving devices affixed in the docking cells to move across the plurality of docking cells; wherein each carriage comprises:
   a planar platform comprising an engagement structure in mating relationship with the ground driving device of each docking cell on a bottom side of the planar platform; and a carriage identification and at least one position tag on each carriage detectable by said one or more carriage position and ID sensors in the docking cells; and (c) a central management system communicating with and controlling operation of said CIU of each docking cell.

2. The system of claim 1, wherein said ground driving device comprises one or more gear driving mechanisms, and said carriage comprises one or more linear gear track in mating relationship with gears of said one or more gear driving mechanisms; wherein each linear gear track is disposed on the bottom side of the planar platform, and extends across an entire length or width of the planar platform and ends at a respective side edge of the planar platform, and wherein each linear gear track includes two opposing open ends.

3. The system of claim 2, wherein each gear track recesses into the bottom side of the planar platform, and each of said open ends of the linear gear track has includes an enlarged opening toward the respective side edge of the planar platform, wherein said enlarged opening tapers inward in a longitudinal direction of the linear gear track, and said enlarged opening facilitates an initial engagement of the carriage with said one or more gear driving mechanisms of neighboring docking cells.

4. The system of claim 3, wherein each said carriage comprises two linear gear tracks disposed orthogonal relative to each other, and across the entire length and width of the planar platform, respectively.

5. The system of claim 2, wherein said gear driving mechanism enables moving the carriage horizontally in two opposing directions, or in four directions orthogonal relative to one and another.

6. The system of claim 2, wherein operations of said gear driving mechanisms in the immediate neighboring docking cells in a moving direction of the carriage are synchronized to drive simultaneously in a same moving direction.

7. The system of claim 2, wherein said ground driving device further comprises multiple supporting wheels affixed at the bottom of, and distributed in, each docking cell to support the carriage.

8. The system of claim 1, wherein said system further comprises one or more elevators, wherein each elevator includes an elevator car comprising one or more elevator docking cells therein and an elevator drive unit to move one or more said carriages among different floor levels; and each elevator docking cell comprises:
said ground driving device affixed at the bottom of the elevator docking cell,
said docking cell control and interface unit, and
said one or more carriage position and ID sensors.

9. The system of claim 1, wherein said central management system comprises an ID association module; wherein the ID association module comprises one or more software programs for grouping identifications of an object to be stored and the carriage on which the object is situated as a pair, and for associating said pair with the docking cell in which the pair is situated to generate an association relation code.

10. The system of claim 9, wherein said ID association module further comprises an ID association database for storing the association relation code associated with each corresponding docking cell; and wherein the ID association database is updated dynamically according to real time report from the CIU of each corresponding docking cell in the system.

11. The system of claim 1, wherein said central management system comprises a parking optimization module; wherein the parking optimization module comprises one or more software programs to assign a priority score to each docking cell for selection of a destination docking cell for storing an object according to: facility layout, time, distance or cost involved in moving a loaded carriage to each docking cell as the destination docking cell.

12. The system of claim 1, wherein said central management system comprises a route optimization module; wherein the route optimization module comprises a route optimization algorithm for selecting a transport route to move a loaded carriage from a starting docking cell to a destination docking cell.

13. The system of claim 12, wherein said route optimization algorithm is an objective function defined by equation (1):

$$f = \text{sum of weighted penalty variables} - \text{sum of weighted reward variables} \quad (1)$$

wherein penalty variables include traveling distance, time or cost involved in a step involved in moving the loaded carriage to the destination docking cell, number of docking cells involved in carriage shuffling in the step, and/or waiting time, traveling time or cost involved in using one or more elevators; and reward variables include reward factors associated with the step or a route that provides one or more benefits.

14. The system of claim 12, wherein said route optimization algorithm is an objective function defined by equation (2):

$$f = \Sigma_{i=1}^{I} d_i^{\delta} + \Sigma_{i=1}^{I} m_i^{\sigma} + \Sigma_{j=0}^{J} t_j^{\alpha} + \Sigma_{k=0}^{K} p_k^{\beta} - \Sigma_{n=0}^{N} w_n^{\gamma} \quad (2)$$

wherein $d_i$ is a traveling distance in step i involved in moving the loaded carriage from the starting docking cell to the destination docking cell; $m_i$ is number of docking cells in step i which would be involved in carriage shuffling in order to move the loaded carriage to the destination docking cell; $t_j$ is an estimated waiting time for an elevator in leg j of an involved elevator use; $p_k$ is a penalty factor in step k; $w_n$ is a reward factor in step n; and $\delta$, $\sigma$, $\alpha$, $\beta$ and $\gamma$ are predetermined weights.

15. The system of claim 12, wherein said route optimization algorithm is an objective function defined by equation (3):

$$f = \Sigma_{i=1}^{I} d_i^{\delta} + \Sigma_{i=1}^{I} m_i^{\sigma} \quad (3)$$

wherein $d_i$ is a traveling distance in step i involved in moving the loaded carriage from the starting docking cell to the destination docking cell; $m_i$ is number of docking cells in step i which would be involved in carriage shuffling in order to move the loaded carriage to the destination docking cell; and $\delta$ and $\sigma$ are predetermined weights.

16. The system of claim 12, wherein said central management system comprises a carriage shuffling control module for controlling and monitoring a process of moving a loaded carriage from the starting docking cell to the destination docking cell according to the transport route selected by the route optimization module.

17. The system of claim 12, wherein said system moves multiple loaded carriages concurrently according to corresponding transport route selected for each of the loaded carriages.

18. A process for storing an object in an automatic stacked storage system, the process comprising the steps of:
(a) registering an object to be stored into the automatic stacked storage system, said system comprising:
(i) a plurality of stationary docking cells positioned one next to another continuously in a lateral direction and a direction orthogonal thereto on a floor of a building or framed structure; each docking cell comprising a cell ID representing an address thereof in said building or framed structure; wherein each docking cell comprises:
- at least one ground driving device affixed on a bottom of the docking cell for driving a carriage engaged thereon in different directions of each docking cell horizontally;
- a docking cell control and interface unit (CIU) comprising at least one microprocessor and one or more operating programs for controlling an operation of said ground driving device; and
- one or more carriage position and ID sensors in communication with said CIU;

(ii) a plurality of said carriages, wherein said carriages are driven by the ground driving devices affixed in the docking cells to move across the plurality of docking cells; wherein each carriage comprises:
- a planar platform comprising an engagement structure in mating relationship with the ground driving device of each docking cell on a bottom side of the planar platform; and
- a carriage identification and at least one position tag on each carriage detectable by said one or more carriage position and ID sensors in the docking cells; and (iii) a central management system communicating with and controlling operation of said CIU of each docking cell;

(b) loading said object on one carriage in a starting docking cell;

(c) selecting a destination docking cell by the central management system;

(d) determining a transport route from a starting docking cell to the destination docking cell by a route optimization module of the central management system; and (e) automatically activating each said ground drive device by the CIU in corresponding docking cells in said transport route, as commanded by the central management system, to drive the carriage with the object loaded thereon horizontally from the starting docking cell through said corresponding docking cells in said transport route to the destination docking cell.

19. The process of claim 18, wherein the transport route is determined by a route optimization algorithm defined by equation (3):

$$f = \Sigma_{i=1}^{I} d_i^\delta + \Sigma_{i=1}^{I} m_i^\sigma \tag{3}$$

wherein $d_i$ is a traveling distance in step i involved in moving a loaded carriage from the starting docking cell to the destination docking cell; $m_i$ is number of docking cells in step i which would be involved in carriage shuffling in order to move the loaded carriage to the destination docking cell; and $\delta$ and $\sigma$ are predetermined weights.

20. The process of claim 18, wherein the destination docking cell is selected based on a priority score of each docking cell in the system assigned by a parking optimization module of the central management system.

* * * * *

UNITED STATES PATENT AND TRADEMARK OFFICE
CERTIFICATE OF CORRECTION

PATENT NO. : 8,897,913 B2
APPLICATION NO. : 13/966380
DATED : November 25, 2014
INVENTOR(S) : Chunsong Luo It is certified that error appears in the above-identified patent and that said Letters Patent is hereby corrected as shown below:

Delete Title Page and replace with new Title Page (Attached)

In the Drawings

On drawing Sheet 1, change "Sheet 1 of 10" to --Sheet 1 of 11--

On drawing Sheet 2, change "Sheet 2 of 10" to --Sheet 2 of 11--

On drawing Sheet 3, change "Sheet 3 of 10" to --Sheet 3 of 11--

On drawing Sheet 4, change "Sheet 4 of 10" to --Sheet 4 of 11--

On drawing Sheet 5, change "Sheet 5 of 10" to --Sheet 5 of 11--

On drawing Sheet 6, change "Sheet 6 of 10" to --Sheet 6 of 11--

On drawing Sheet 7, change "Sheet 7 of 10" to --Sheet 7 of 11--

On drawing Sheet 8, change "Sheet 8 of 10" to --Sheet 8 of 11--

Between drawing Sheets 8 and 9, insert attached drawing sheet --Sheet 9 of 11--

On drawing Sheet 9, change "Sheet 9 of 10" to --Sheet 10 of 11--

On drawing Sheet 10, change "Sheet 10 of 10" to --Sheet 11 of 11--

Signed and Sealed this
Twenty-eighth Day of July, 2015

Michelle K. Lee
*Director of the United States Patent and Trademark Office*

(12) United States Patent
Luo

(10) Patent No.: US 8,897,913 B2
(45) Date of Patent: Nov. 25, 2014

(54) AUTOMATIC STACKED STORAGE SYSTEM FOR PARKING OR STORAGE

(71) Applicant: Chunsong Luo, Cranston, RI (US)

(72) Inventor: Chunsong Luo, Cranston, RI (US)

(*) Notice: Subject to any disclaimer, the term of this patent is extended or adjusted under 35 U.S.C. 154(b) by 0 days.

(21) Appl. No.: 13/966,380

(22) Filed: Aug. 14, 2013

(65) Prior Publication Data
US 2014/0114466 A1 Apr. 24, 2014

Related U.S. Application Data

(60) Provisional application No. 61/795,545, filed on Oct. 19, 2012.

(51) Int. Cl.
G06F 7/00 (2006.01)
B65G 1/04 (2006.01)
E04H 6/22 (2006.01)

(52) U.S. Cl.
CPC .............. B65G 1/0478 (2013.01); E04H 6/22 (2013.01)
USPC ............ 700/224; 700/213; 700/217; 700/218

(58) Field of Classification Search
None
See application file for complete search history.

(56) References Cited

U.S. PATENT DOCUMENTS

| | | | |
|---|---|---|---|
| 3,618,793 A * | 11/1971 | Coursey | 414/233 |
| 6,212,832 B1 | 4/2001 | Gao | |
| 6,842,665 B2 | 1/2005 | Karlen | |
| 7,123,988 B2 | 10/2006 | Russell et al. | |
| 7,941,243 B2 | 5/2011 | Borgwarth et al. | |
| 2005/0207876 A1 | 9/2005 | Springwater | |

* cited by examiner

Primary Examiner — Yolanda Cumbess
(74) Attorney, Agent, or Firm — CUSPA Technology Law Associates; Yi Li

(57) ABSTRACT

An automatic stacked parking or storage system includes a plurality of stationary docking cells, a plurality of carriages, and a central management system communicating with and controlling operations of the docking cells. Each docking cell has a ground driving device affixed on the bottom of the docking cell to drive a carriage horizontally in different directions of the docking cell, a docking cell control and interface unit (CIU), and one or more carriage position and ID sensor. A loaded carriage is moved horizontally by the ground driving devices of corresponding docking cells from a starting to a destination docking cell according to a route selected by a route optimization module. The location of the loaded carriage in the selected route is dynamically updated according to real time reports from each CIU of the corresponding docking cells. The system transports multiple loaded carriages at the same time for parking/storage and retrieval.

20 Claims, 11 Drawing Sheets